(12) United States Patent
Golshan et al.

(10) Patent No.: US 10,116,634 B2
(45) Date of Patent: Oct. 30, 2018

(54) INTERCEPTING SECURE SESSION UPON RECEIPT OF UNTRUSTED CERTIFICATE

(71) Applicant: A10 Networks, Inc., San Jose, CA (US)

(72) Inventors: Ali Golshan, Palo Alto, CA (US); Xuyang Jiang, Saratoga, CA (US); Yang Yang, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 241 days.

(21) Appl. No.: 15/195,812

(22) Filed: Jun. 28, 2016

(65) Prior Publication Data

US 2017/0374043 A1    Dec. 28, 2017

(51) Int. Cl.
*G06F 9/00* (2006.01)
*G06F 15/177* (2006.01)
(Continued)

(52) U.S. Cl.
CPC ........ *H04L 63/0471* (2013.01); *H04L 9/3268* (2013.01); *H04L 63/0209* (2013.01);
(Continued)

(58) Field of Classification Search
CPC ............. H04L 63/0471; H04L 63/0464; H04L 63/0209; H04L 63/18; H04L 9/3268; H04L 2209/76; H04L 2209/60
(Continued)

(56) References Cited

U.S. PATENT DOCUMENTS 4,780,905 A    10/1988  Cruts et al.
5,511,122 A    4/1996   Atkinson
(Continued)

FOREIGN PATENT DOCUMENTS

| TW | I241818 B | 10/2005 |
| WO | WO1999048303 A2 | 9/1999 |
| WO | WO2000062167 A1 | 10/2000 |
| WO | WO2006039529 A2 | 4/2006 |
| WO | WO2015030977 A1 | 3/2015 |

OTHER PUBLICATIONS

Spatscheck et al., "Optimizing TCP Forwarder Performance", IEEE/ACM Transactions on Networking, vol. 8, No. 2, Apr. 2000, pp. 146-157.
(Continued)

*Primary Examiner* — Kambiz Zand
*Assistant Examiner* — Mahabub S Ahmed
(74) *Attorney, Agent, or Firm* — Keith Kline; The Kline Law Firm PC (57) ABSTRACT

A method for intercepting, by a security gateway, a secure data session comprises the steps of establishing a first secure data session between a client device and a server device, intercepting the first secure data session by the security gateway, establishing a second secure data session between the server device and the security gateway, receiving a first secure session request from the client device, generating a second secure session request based on the first secure session request, receiving a server certificate from the server device, sending the second secure session request to the server device, receiving first secure content from the client device over the first secure data session, creating first encrypted secure content using the first secure content and the server certificate, and sending the first encrypted secure content to the server device over the second secure data session.

20 Claims, 5 Drawing Sheets

(51) Int. Cl.
*H04L 29/06* (2006.01)
*H04L 9/32* (2006.01)
(52) U.S. Cl.
CPC .......... *H04L 63/18* (2013.01); *H04L 2209/60* (2013.01); *H04L 2209/76* (2013.01)
(58) Field of Classification Search
USPC ........................................................ 713/153
See application file for complete search history.

(56) References Cited

U.S. PATENT DOCUMENTS

| | | |
|---|---|---|
| 5,584,023 A | 12/1996 | Hsu |
| 5,757,908 A | 5/1998 | Cooper et al. |
| 5,805,801 A | 9/1998 | Holloway et al. |
| 5,835,727 A | 11/1998 | Wong et al. |
| 5,892,903 A | 4/1999 | Klaus |
| 5,905,859 A | 5/1999 | Holloway et al. |
| 6,006,272 A | 12/1999 | Aravamudan et al. |
| 6,170,061 B1 | 1/2001 | Beser |
| 6,185,681 B1 | 2/2001 | Zizzi |
| 6,219,706 B1 | 4/2001 | Fan et al. |
| 6,249,866 B1 | 6/2001 | Brundrett et al. |
| 6,259,789 B1 | 7/2001 | Paone |
| 6,347,376 B1 | 2/2002 | Attwood et al. |
| 6,363,486 B1 | 3/2002 | Knapton, III |
| 6,505,192 B1 | 1/2003 | Godwin et al. |
| 6,539,435 B2 | 3/2003 | Bolmarcich et al. |
| 6,553,005 B1 | 4/2003 | Skirmont et al. |
| 6,578,147 B1 | 6/2003 | Shanklin et al. |
| 6,735,702 B1 | 5/2004 | Yavatkar et al. |
| 6,973,040 B1 | 12/2005 | Ricciulli |
| 7,092,357 B1 | 8/2006 | Ye |
| 7,200,760 B2 | 4/2007 | Riebe et al. |
| 7,221,757 B2 | 5/2007 | Alao |
| 7,234,161 B1 | 6/2007 | Maufer et al. |
| 7,277,963 B2 | 10/2007 | Dolson et al. |
| 7,372,809 B2 | 5/2008 | Chen et al. |
| 7,409,712 B1 | 8/2008 | Brooks et al. |
| 7,478,429 B2 | 1/2009 | Lyon |
| 7,533,409 B2 | 5/2009 | Keane et al. |
| 7,596,695 B2 | 9/2009 | Liao et al. |
| 7,620,733 B1 | 11/2009 | Tzakikario et al. |
| 7,739,494 B1 | 6/2010 | McCorkendale et al. |
| 7,823,194 B2 | 10/2010 | Shay |
| 7,845,004 B2 | 11/2010 | Bardsley et al. |
| 7,925,766 B2 | 4/2011 | Jayawardena et al. |
| 7,953,855 B2 | 5/2011 | Jayawardena et al. |
| 8,010,469 B2 | 8/2011 | Kapoor et al. |
| 8,089,871 B2 | 1/2012 | Iloglu et al. |
| 8,276,203 B2 | 9/2012 | Nakhre et al. |
| 8,286,227 B1 | 10/2012 | Zheng |
| 8,375,453 B2 | 2/2013 | Jackson et al. |
| 8,661,246 B1* | 2/2014 | Hoech ................... H04L 9/3247 709/206 |
| 8,719,446 B2 | 5/2014 | Spatscheck et al. |
| 8,881,284 B1 | 11/2014 | Gabriel |
| 8,948,380 B2 | 2/2015 | Goto |
| 9,129,116 B1 | 9/2015 | Wiltzius |
| 9,130,996 B1 | 9/2015 | Martini |
| 9,245,121 B1 | 1/2016 | Luo et al. |
| 9,246,926 B2 | 1/2016 | Erlingsson et al. |
| 9,294,503 B2 | 3/2016 | Thompson et al. |
| 9,300,623 B1 | 3/2016 | Earl et al. |
| 9,537,886 B1 | 1/2017 | Gareau |
| 9,584,318 B1 | 2/2017 | Yang et al. |
| 9,705,852 B2* | 7/2017 | Bollay ................... H04L 63/166 |
| 9,794,064 B2* | 10/2017 | Anderson ................ H04L 9/08 |
| 9,819,648 B1* | 11/2017 | Chilakapati ......... H04L 63/0428 |
| 2002/0108059 A1 | 8/2002 | Canion et al. |
| 2002/0165912 A1 | 11/2002 | Wenocur et al. |
| 2003/0023876 A1 | 1/2003 | Bardsley et al. |
| 2003/0035547 A1 | 2/2003 | Newton |
| 2003/0123667 A1 | 7/2003 | Weber et al. |
| 2004/0057579 A1 | 3/2004 | Fahrny |
| 2004/0091114 A1 | 5/2004 | Carter et al. |
| 2004/0103283 A1* | 5/2004 | Hornak ................... H04L 29/06 713/175 |
| 2004/0148520 A1 | 7/2004 | Talpade et al. |
| 2004/0172538 A1 | 9/2004 | Satoh et al. |
| 2004/0187032 A1 | 9/2004 | Gels et al. |
| 2005/0044352 A1 | 2/2005 | Pazi et al. |
| 2005/0125684 A1 | 6/2005 | Schmidt |
| 2005/0149723 A1* | 7/2005 | Watkins ............... H04L 63/0823 713/156 |
| 2005/0180416 A1 | 8/2005 | Jayawardena et al. |
| 2005/0193199 A1 | 9/2005 | Asokan et al. |
| 2005/0198099 A1 | 9/2005 | Motsinger et al. |
| 2005/0235145 A1 | 10/2005 | Slick et al. |
| 2005/0278527 A1 | 12/2005 | Liao et al. |
| 2006/0179319 A1 | 8/2006 | Krawczyk |
| 2006/0184802 A1* | 8/2006 | Ibrahim ................. G06F 21/10 713/189 |
| 2006/0185014 A1 | 8/2006 | Spatscheck et al. |
| 2006/0230444 A1 | 10/2006 | Iloglu et al. |
| 2007/0143769 A1 | 6/2007 | Bu et al. |
| 2007/0169194 A1 | 7/2007 | Church et al. |
| 2007/0186282 A1 | 8/2007 | Jenkins |
| 2007/0214088 A1 | 9/2007 | Graham et al. |
| 2007/0280114 A1 | 12/2007 | Chao et al. |
| 2007/0283429 A1 | 12/2007 | Chen et al. |
| 2008/0060053 A1* | 3/2008 | Kang ..................... G06F 21/105 726/2 |
| 2008/0126794 A1* | 5/2008 | Wang ................... H04L 63/0464 713/151 |
| 2009/0077383 A1* | 3/2009 | de Monseignat ... H04L 63/0823 713/175 |
| 2009/0077663 A1 | 3/2009 | Sun et al. |
| 2009/0083537 A1* | 3/2009 | Larsen ................ H04L 63/0281 713/153 |
| 2009/0119504 A1* | 5/2009 | van Os ................. H04L 9/3271 713/153 |
| 2010/0017848 A1* | 1/2010 | Pomerantz ............. H04L 63/20 726/2 |
| 2010/0131646 A1 | 5/2010 | Drako |
| 2010/0131766 A1* | 5/2010 | Schneider ........... H04L 63/0823 713/175 |
| 2010/0138921 A1 | 6/2010 | Na et al. |
| 2010/0228968 A1* | 9/2010 | Wason ................... H04L 9/3273 713/156 |
| 2011/0188452 A1 | 8/2011 | Borleske et al. |
| 2011/0231652 A1* | 9/2011 | Bollay ................... H04L 63/166 713/153 |
| 2011/0282997 A1 | 11/2011 | Prince et al. |
| 2012/0096546 A1 | 4/2012 | Dilley et al. |
| 2012/0144461 A1 | 6/2012 | Rathbun |
| 2012/0155274 A1 | 6/2012 | Wang et al. |
| 2012/0159623 A1 | 6/2012 | Choi |
| 2012/0170753 A1 | 7/2012 | Pandrangi et al. |
| 2012/0173684 A1 | 7/2012 | Courtney et al. |
| 2012/0174196 A1 | 7/2012 | Bhogavilli et al. |
| 2012/0227109 A1 | 9/2012 | Dimuro |
| 2012/0250866 A1 | 10/2012 | Matsuo |
| 2012/0260329 A1 | 10/2012 | Suffling |
| 2012/0266242 A1 | 10/2012 | Yang et al. |
| 2013/0086378 A1* | 4/2013 | Yao ......................... H04L 9/006 713/156 |
| 2013/0103834 A1 | 4/2013 | Dzerve et al. |
| 2013/0145151 A1* | 6/2013 | Brown ................. H04L 9/3268 713/156 |
| 2013/0198845 A1 | 8/2013 | Anvari |
| 2013/0227646 A1 | 8/2013 | Haggerty et al. |
| 2013/0243194 A1 | 9/2013 | Hawkes et al. |
| 2013/0263256 A1 | 10/2013 | Dickinson et al. |
| 2014/0164768 A1* | 6/2014 | Kruglick ............... H04L 63/062 713/168 |
| 2014/0189093 A1 | 7/2014 | du Toit ................... H04L 47/10 709/224 |
| 2014/0325648 A1 | 10/2014 | Liu et al. |
| 2014/0344925 A1 | 11/2014 | Muthiah |
| 2015/0058916 A1* | 2/2015 | Rostami-Hesarsorkh ................... H04L 63/1408 726/1 |

(56) References Cited

U.S. PATENT DOCUMENTS

| | | | |
|---|---|---|---|
| 2015/0058977 | A1 | 2/2015 | Thompson et al. |
| 2015/0113264 | A1* | 4/2015 | Wang ............... H04L 63/0823 713/151 |
| 2015/0143118 | A1 | 5/2015 | Sheller et al. |
| 2015/0220745 | A1* | 8/2015 | Nellitheertha .......... G06F 15/16 713/193 |
| 2015/0281177 | A1 | 10/2015 | Sun |
| 2015/0288514 | A1* | 10/2015 | Pahl ..................... H04L 9/085 713/171 |
| 2016/0036651 | A1 | 2/2016 | Sureshchandra et al. |
| 2016/0119374 | A1* | 4/2016 | Williams ............ H04L 63/1441 713/175 |
| 2016/0134655 | A1 | 5/2016 | Thompson et al. |
| 2016/0164685 | A1* | 6/2016 | Ashley ............... H04L 63/0823 713/175 |
| 2016/0182509 | A1 | 6/2016 | Kantecki et al. |
| 2016/0226896 | A1 | 8/2016 | Bhogavilli et al. |
| 2016/0337321 | A1* | 11/2016 | Lin ..................... H04L 63/0428 |
| 2017/0026186 | A1* | 1/2017 | Gu ........................ H04L 9/3265 |
| 2017/0063557 | A1* | 3/2017 | Chalmandrier-Perna .................. H04L 9/3268 |
| 2017/0063841 | A1* | 3/2017 | Candelore ........... H04L 63/0823 |
| 2017/0085372 | A1* | 3/2017 | Anderson ................. H04L 9/08 |
| 2017/0155642 | A1* | 6/2017 | Kobayashi ............ H04L 9/3268 |
| 2017/0171187 | A1* | 6/2017 | Yin ....................... H04L 63/083 |
| 2017/0359317 | A1* | 12/2017 | Anderson ........... H04L 63/0428 |

OTHER PUBLICATIONS

Mutz, Marc, "Linux Encryption HOWTO," Oct. 4, 2000, available at URL: <http://encryptionhowto.sourceforge.net/Encryption-HOWTO-1.html>, 49 pages.

Obimo et al., "A parallel algorithm for determining the inverse of a matrix for use in blockcipher encryption/decryption," Journal of Supercomputing, vol. 39, No. 2, pp. 113-130, Feb. 27, 2007.

Long et al., "ID-based threshold decryption secure against adaptive chosen-ciphertext attack," Computers and Electrical Engineering, vol. 33, No. 3, pp. 166-176, May 2007.

Popek, Gerald J. et al., "Encryption and Secure Computer Networks," Computing Surveys, vol. 11, No. 4, pp. 331-356, Dec. 1979.

Liebergeld, Steffen et al., "Cellpot: A Concept for Next Generation Cellular Network Honeypots," Internet Society, Feb. 23, 2014, pp. 1-6.

Lee, Patrick P. C. et al., "On the Detection of Signaling DoS Attacks on 3G Wireless Networks," IEEE INFOCOM 2007—26th IEEE International Conference on Computer Communications processings, May 6-12, 2007, pp. 1289-1297.

Hanasegaran et al., "Simultaneous Analysis of Time and Space for Conflict Detection in Time-Based Firewall Policies," Jul. 2010, IEEE 10th International Conference on Computer and Information Technology, pp. 1015-1021.

Kaufman, Charlie et al., "DoS Protection for UDP-Based Protocols," CCS 2003, Oct. 27-31, 2003, pp. 2-7.

Castelluccia, Claude et al., "Improving Secure Server Performance by Re-balancing SSL/TLS Handshakes," ASIACCS 2006, Mar. 21-24, 2006, pp. 26-34.

"Network- vs. Host-based Intrusion Detection, a Guide to Intrusion Detection Technology", Oct. 2, 1998, Internet Security Systems [online], Retrieved from the Internet: <URL:http://documents.iss.net/whitepapers/nvh-ids.pdf>, 10 pages.

Hunt, Gurney D. H. et al., "Network Dispatcher: a connection router for scalable Internet services", 1998, Proceedings of the 7th International World Wide Web Conference (WWW7), Retreived from the Internet: <URl:http://www.unizh.ch/home/mazzo/reports/www7conf/fullpapers/1899/com1899.htm>, 14 pages.

* cited by examiner

INTERCEPTING SECURE SESSION UPON RECEIPT OF UNTRUSTED CERTIFICATE

TECHNICAL FIELD

This disclosure relates generally to data networks and, more specifically, to a security gateway intercepting secure data communication sessions using an untrusted server certificate.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Many service providers and corporates have policies to govern use of digital computers and data networks, particularly policies governing data security. It is not uncommon for these entities to inspect data communications used by a client device or a server device within their data networks. Recent security network technologies and products can even allow businesses to inspect data communication sessions that are encrypted. For example, an employee can be browsing a secure website using a Secure Sockets Layer (SSL) session using his or her office computer. The employer can install a SSL intercept network appliance capable of intercepting the SSL session between the employee office computer and the secure website. The SSL intercept network appliance can provide a security session gateway between the secure website and the office computer. When the security network appliance receives a security certificate from the secure website, the security network appliance can generate a corporate issued certificate for the office computer such that the security network appliance is able to conduct a secure communication session with the office computer using the corporate issued certificate while the security network appliance conducts a separate secure communication session with the secure website using the website's security certificate. The security network appliance can use the two secure sessions to relay secure content exchanged between the office computer and the secure website, with the secure content being decrypted and inspected by the security network appliance in order to apply appropriate policies of the business entity. In the above scenario, the security network appliance is able to apply the necessary policies on behalf of the business entity.

It is, however, not uncommon for a user of a client device to access a secure website using an untrusted security certificate (not issued by a public trusted certificate authority (CA)) or issued privately by the secure website. In this scenario, the client device can ask the user interactively if the user wishes to continue with the secure session. The user may choose to proceed. Alternatively, the user may become suspicious of the website and choose not to proceed. Unfortunately, not all users are able determine whether a particular website is suspicious, thereby making the office computer and corporate data network vulnerable to malicious activities involving untrusted security certificates. Accordingly, existing technologies may not adequately protect corporate data and computer environment.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to methods for intercepting, by a security gateway, a secure data session between a client device and a server device. An example method comprises the steps of establishing a first secure data session between the client device and the server device via the security gateway, intercepting the first secure data session by the security gateway, establishing a second secure data session between the server device and the security gateway, receiving a first secure session request from the client device over the first secure data session, generating, by the security gateway, a second secure session request based on the first secure session request, receiving a server certificate from the server device over the second secure data session, sending, by the security gateway, the second secure session request to the server device over the second secure session, receiving first secure content from the client device over the first secure data session, creating first encrypted secure content using the first secure content and the server certificate from the server device, and sending the first encrypted secure content to the server device over the second secure data session.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

For purposes of this patent document, the terms "or" and "and" mean "and/or" unless stated otherwise or clearly intended otherwise by the context of their use. The term "a" means "one or more" unless stated otherwise or where the use of "one or more" is clearly inappropriate. The terms "comprise," "comprising," "include," and "including" are interchangeable and not intended to be limiting. For example, the term "including" can be interpreted to mean "including, but not limited to."

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The present disclosure relates to a system and methods for providing secure data communication between a client device and server. More specifically, the present disclosure is related to methods for intercepting by a security gateway a secure data session between a client device and a server device. The method comprises the steps of establishing a first secure data session between the client device and the server device via the security gateway, intercepting the first secure data session by the security gateway, establishing a second secure data session between the server device and the security gateway, receiving a first secure session request from the client device over the first secure data session, generating by the security gateway a second secure session request based on the first secure session request, sending a second secure session request to the server device over the second secure session, and receiving a server certificate from the server device over the second secure data session.

The method of the security gateway can also include accessing a server certificate table containing a plurality of security certificates from a data store and determining that the server certificate obtained from the server device is untrusted by matching the server certificate against the plurality of security certificates of the security certificate table. In response to determining that the server certificate is untrusted, the security gateway can check a security policy and determine whether interception of content transferrable using the first secure session or the second secure session is required.

If it is determined that interception of content being transferred via the first secure session or the second secure session is required, the security gateway can create a gateway certificate based on the server certificate. The security gateway copies the server certificate to the gateway certificate, replaces a server security key with a gateway security key, where the gateway security key is untrusted, and signs the gateway certificate using the gateway key.

In response to the creation of the gateway certificate, the security gateway sends the gateway certificate to the client device in a packet as a response to the first secure session request. The client device can then determine that the gateway certificate is untrusted, and if so, the client device may use the first secure data session to transmit secure data from the client device to the server device.

Furthermore, the security gateway can receive first secure content from the client device over the first secure data session, create first encrypted secure content using the first secure content and the server certificate from the server device, and send the first encrypted secure content to the server device over the second secure data session. The security gateway can also receive second secure content from the server device over the second secure data session, create second encrypted secure content using the second secure content and a gateway certificate, and send the second encrypted secure content to the client device over the first secure data session.

Figure 1:
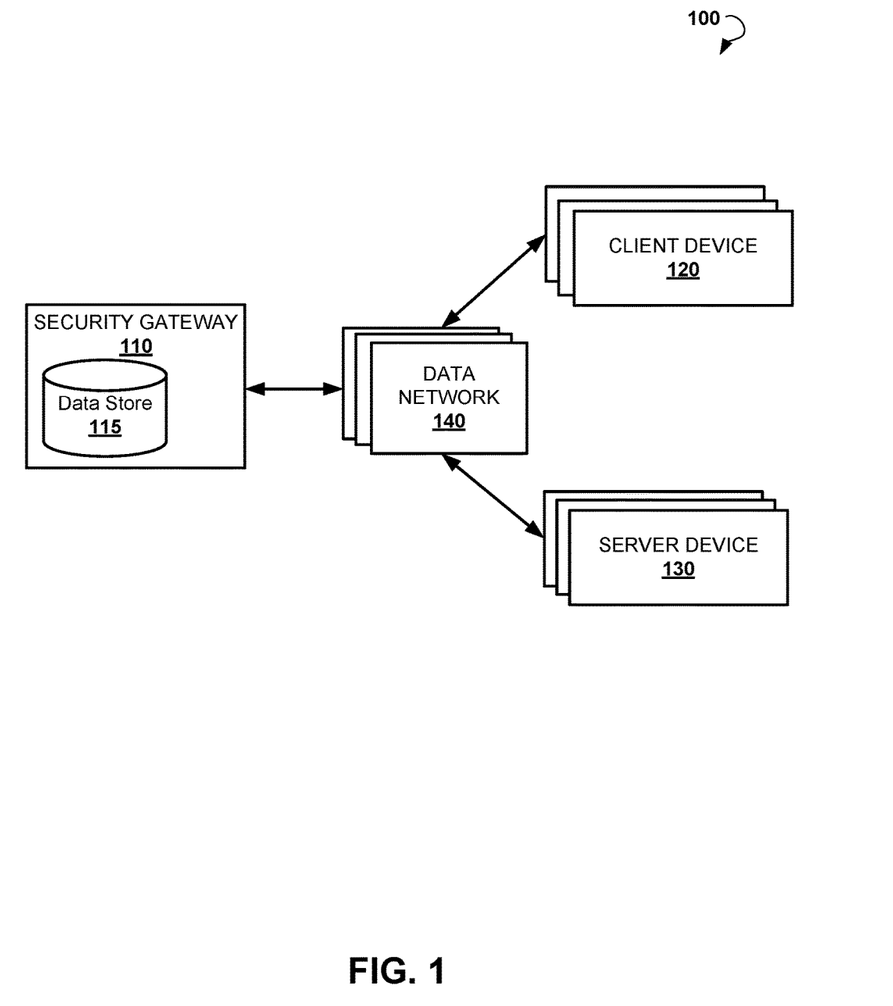
FIG. 1 illustrates an example embodiment of computer environment within which methods and systems for intercepting a secure session with an untrusted server certificate can be implemented.

Referring now to the drawings, FIG. 1 illustrates an example embodiment of computer environment 100 within which methods and systems for intercepting a secure session with an untrusted server certificate can be implemented. The computer environment 100 includes a security gateway 110 configured to establish a secure data communication session between a client device 120 and a server device 130 using one or more data networks 140.

In this disclosure, the client device 120 can include a personal computer, laptop computer, tablet computer, smartphone, mobile phone, Internet phone, netbook, home gateway, broadband gateway, network appliance, set top box, media server, personal media play, personal digital assistant, access gateway, networking switch, server computer, network storage computer, game console, entertainment system, infotainment system, vehicle computer, or any other network node or computing device comprising at least a network module and a processor module. In certain embodiments, the computer environment 100 can include a plurality of client devices 120, each of which can communicate with the security gateway 110 as described herein.

The server device 130 can include both a physical machine and software on the machine that can store, receive, send, process, and generate data such as files, data packets, data communications, and the like. In some embodiments, the server device 130 can include any suitable network node or computing device comprising at least a network module and a processor module. In certain embodiments, the server device 130 can include a plurality of server devices 130, each of which can communicate with the security gateway 110 as described herein.

The security gateway 110 can include a gateway application (software or middleware), however this term can also encompass any server, network node, or computing device configured to perform any or all of functionality described herein. In one embodiment, the security gateway 110 is configured to communicate to the client device 120 and communicate to the server device 130 using one or more communication sessions such as secure sessions. The security gateway 110 can include or communicate with data storage for storing data communication-related information, encryption information, public keys, private keys, certificates, and so forth.

In certain embodiments, the security gateway 110 is a network node and includes one or more of functionality of a firewall, a SSL proxy gateway, a server load balancer (SLB), an application delivery controller (ADC), a threat protection system (TPS), a secure traffic manager, a legal interception gateway, a virtual private network (VPN) gateway, a TCP proxy gateway, or any other network security functionality. In various embodiments, the security gateway 110 includes one or more hardware security modules (HSMs). The HSM can include a hardware-based crypto module or a hardware-based encryption engine. In one embodiment, the security gateway 110 includes a network security system including one or more network nodes and a data network, where one network node processes a secure session with the client device 120 and another network node processes another secure session with the server device 130. In additional embodiments, the security gateway 110 includes a security application to process decrypted intercepted secure session data traffic. The security application may include virus detection module, credit card fraud detection module, document or identity theft detection module, session recording module, cyber-attack detection module, company security policy processing module, government security policy, compliant processing module, and so forth.

Still referring to FIG. 1, the security gateway 110 can be operatively connected to one or more client devices 120 and one or more server devices 130 over one or more data networks 140. In one embodiment, the security gateway 110 connects to the client device 120 in a data network different from a data network connecting the security gateway 110 and the server device 130. Thus, the data network 140 can include two or more data sub-networks for the connections. In other embodiments, the data network 140 is a single network environment for connection between the security gateway 110, the client device 120, and the server device 130. The data network 140 can also communicate to other external devices, external computing devices, servers, and networked systems.

According to embodiments of this disclosure, the data network 140 refers to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), BLUETOOTH™ radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network 140 includes a corporate network, data center network, service provider network, mobile operator network, or any combinations thereof.

Figure 2:
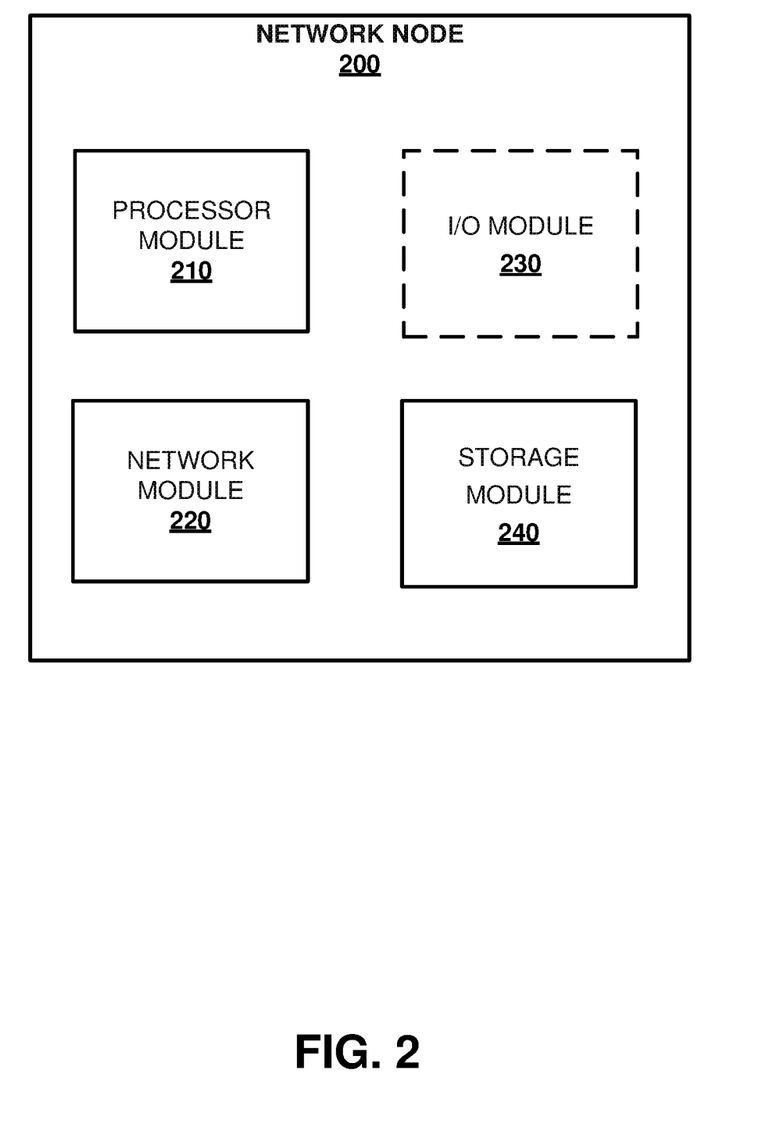
FIG. 2 illustrates an example embodiment of a network node.

FIG. 2 illustrates an example embodiment of a network node 200 which can have an implementation of the security gateway 110, the client device 120, or the server device 130. In some embodiments, the network node 200 can also include a network appliance or a computing device suitable for performing at least some methods steps described herein. As shown in FIG. 2, the network node 200 includes a processor module 210, a network module 220, an optional input/output (I/O) module 230, and a storage module 240. These elements may be interconnected via a local microprocessor bus, one or more I/O buses, printed circuit board, or any other electrical, optical, or electromagnetic interface, of any combinations thereof.

The processor module 210 may include one or more processors such as microprocessors, microcontrollers, processors, central-computing units (CPUs), and so forth. In addition, the processor module 210 can include one or more processor cores embedded in a single processor. In some embodiments, the processor module 210 includes one or more embedded processors, or embedded processing elements in the form of a Field Programmable Gate Array (FPGA), an Application Specific Integrated Circuits (ASICs), or Digital Signal Processors (DSPs). The processor module 210 can be configured to provide data processing, for example, implement computer-readable or processor-readable instructions stored in the storage module 240 or received with the network module 220 to perform one or more method steps described herein.

The network module 220 can be utilized to communicate with external devices, external computing devices, server devices, client devices, security gateways, and any other networked computing devices via one or more data networks such as one or more wired, wireless, or optical networks including, for example, the Internet, intranet, LAN, WAN, T1/T3 interface, cellular phone networks, BLUETOOTH™ radio, Ethernet, IEEE 802.11-based interface, among others. The network module 220 may also include a network interface card, such as an Ethernet card, optical transceiver, radio frequency transceiver, or any other type of device that can send and receive information. In some embodiments, the network module 220 includes a network processor for processing data involved in data communication.

The optional I/O module 230 provides a portion of a user interface. Input devices of the I/O module 230 may include an alphanumeric keypad, such as a keyboard, for inputting alphanumeric and other information, or a pointing device, such as a mouse, trackball, stylus, cursor direction keys, motion detector, camera, microphone, and so forth. Output devices of the I/O module 230 can include suitable output devices including displays, touchscreens, projectors, speakers, printers, haptic devices, and so forth.

The storage module 240 provides data storage functions. The storage module 240 may be implemented as a non-volatile computer-readable (processor-readable) medium such as, for example, a magnetic disk drive, magnetic memory device, optical disk drive, optical memory device, solid-state disk drive, solid-state memory device, Read-Only Memory (ROM), Random-Access Memory (RAM), Static Random-Access Memory (SRAM), Dynamic Random-Access Memory (DRAM), Programmable Read-Only Memory (PROM), Erasable Programmable Read-Only Memory (EPROM), or any other optical medium, any other physical medium, any other memory chip or cartridge, a carrier wave, or any other medium that can be read or used for write by a computer or processor. The storage module 240 can store system software, middleware, firmware, software applications, downloadable applications, operating systems, or data for implementing at least some of method steps described herein.

Figure 3:
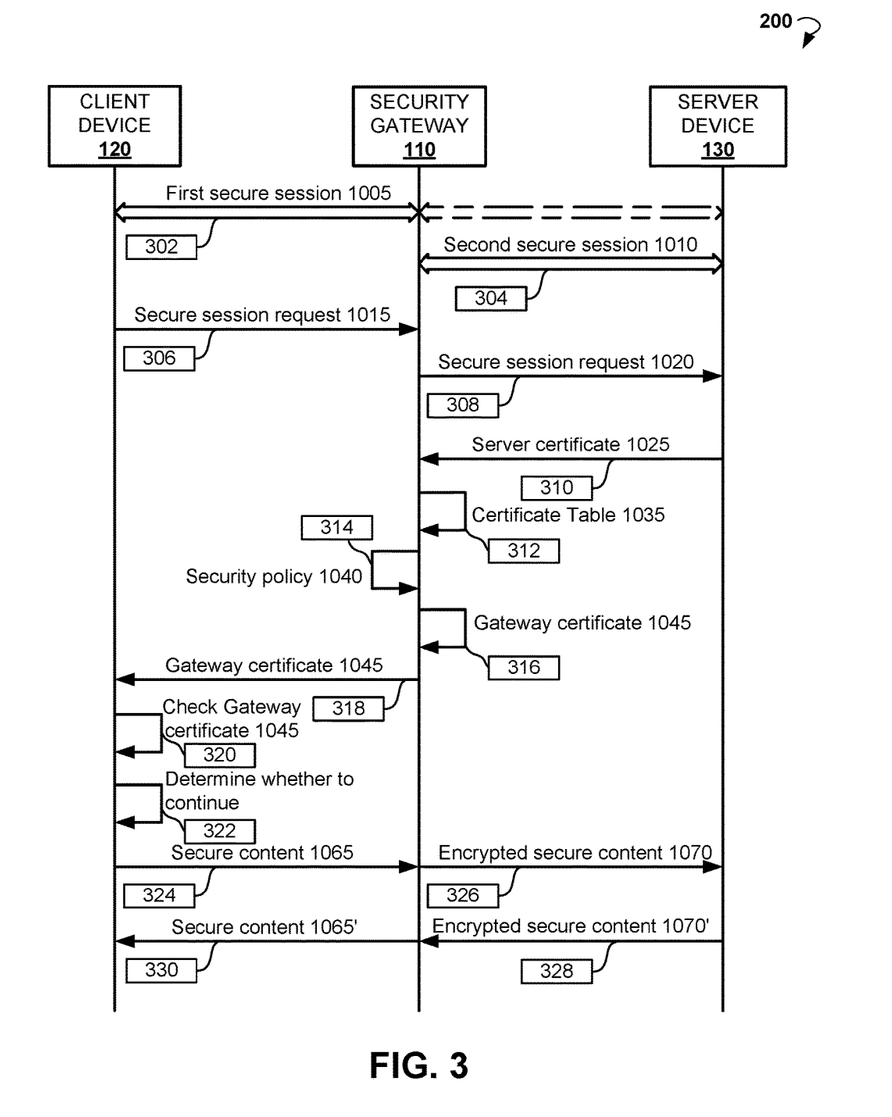
FIG. 3 illustrates a time diagram of a method for processing a secure session between a client device and a server device.

FIG. 3 illustrates a time diagram of a method 300 for intercepting a secure session by a security gateway when the secure session uses an untrusted security certificate, according to one example embodiment. The method 300 may be performed by processing logic that may comprise hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the method 300 is implemented by the devices of the computer environment 100 such as by the security gateway 110, the client device 120, and the server device 130. The steps of method 300 may be implemented in an order different than described and shown in FIG. 3. Moreover, the method 300 may have additional steps not shown herein, but which can be evident for those skilled in the art from the present disclosure. The method 300 may also have fewer steps than outlined below and shown in FIG. 3.

The method 300 can commence at step 302 with the client device 120 establishing and communicating a secure (data) session 1005 with the server device 130 via the security gateway 110. In this disclosure, the term "data session" is also referred to as "session" and means any digital exchange of information.

Thus, the data session may include an exchange of data, data packets, files, voice, video, email, text messages, or any combination thereof. Moreover, the data session may be established and maintained using a number of protocols residing at layer 3 or higher of the Open System Interconnection (OSI) model, including, but not limited to, Internet Protocol (IP), Internet Control Message Protocol (ICMP), Simple Object Access Protocol (SOAP), Transmission Control Protocol (TCP), User Datagram Protocol (UDP), Hypertext Transfer Protocol (HTTP), File Transfer Protocol (FTP), Transport Layer Security (TLS) protocol, Secure Sockets Layer (SSL) protocol, Internet Protocol Security (IPSec), Voice over IP (VoIP), secure video or audio streaming protocols, secure conferencing protocols, secure document access protocols, secure network access protocols, secure e-commerce protocols, secure business-to-business transaction protocols, secure financial transaction protocols, secure collaboration protocols, secure on-line game session protocols, and so forth.

In step 304, the security gateway 110 can intercept the secure session 1005 and establish another (second) secure session 1010 with the server device 130. Furthermore, in step 306, the security gateway 110 can receive a first secure session request 1015 from the client device 120 over the secure session 1005. In some embodiments, the first secure session request 1015 includes a request message for a SSL session, a TLS session, an IP session, a secure TCP session, or a request message specified in a secure session protocol used by the client device 120.

In step 308, the security gateway 110 generates a second secure session request 1020 based on the first secure session request 1015 and sends the second secure session request 1020 to the server device 130 over the second secure session 1010. The second secure session request 1020 can differ from the first secure session request.

In step 310, upon receiving and processing the second secure session request 1020, the server device 130 can create a server certificate 1025 and send the server certificate 1025 in a session response over the second secure session 1010 to the security gateway 110.

In step 312, the security gateway 110 can obtain the server certificate 1025 and determine whether the server certificate 1025 is trusted. In one embodiment, the security gateway 110 accesses or retrieves a server certificate table 1035 containing a plurality of security certificates. The server certificate table 1035 can be maintained in a data store 115 of the security gateway 110. The data store 115 can also include the storage module 240 of the network node 200.

The security gateway 110 can determine whether the server certificate 1025 is trusted by matching the server certificate 1025 against records of the security certificate table 1035. In some embodiments, the security gateway 110 determines that the server certificate 1025 is untrusted. Alternatively, the security gateway 110 determines that the server certificate 1025 is trusted.

If the security gateway 110 determines that the server certificate 1025 is untrusted, the method 300 proceeds to step 314. In step 314, the security gateway 110 checks an applicable security policy 1040 to determine of interception of secure content of the secure session 1005 and secure session 1010 is required. In some embodiments, the security policy 1040 relates to one or more of the server device 130, client device 120, and an identity such as a server name indication (SNI) or issuing organization can be determined based on the server certificate 1025. Thus, in step 314, the security gateway 110 matches at least some information concerning the server device 130, obtained, for example, from the secure session 1010, information concerning the client device 120 obtained from the secure session 1005, or information obtained from the server certificate 1025, against the security policy 1040.

In some embodiments, the security gateway 110 can determine, based on the security policy 1040, that interception of the secure content of the secure session 1005 and secure session 1010 is needed. In this scenario, in step 316, the security gateway 110 creates a gateway certificate 1045 based on the server certificate 1025. In some embodiments, the security gateway 110 copies the server certificate 1025 to the gateway certificate 1045 except that the security gateway 110 replaces a server security key in the server certificate 1025 with a gateway security key in the gateway certificate 1045, and signs the gateway certificate 1045 using the gateway security key. For example, the security gateway 110 can copy a certificate issuing organization information, a validity information and/or other information, except for the security key, into the gateway certificate 1045. In certain embodiments, the gateway security key is pre-stored in the security gateway 110 (e.g., in the data store 115). It should be noted that in the scenario where the server certificate 1025 is untrusted as outlined above, the gateway certificate 1045 is also untrusted with respect to the client device 120. Accordingly, when the client device 120 receives the gateway certificate 1045, the client device 120 determines that the certificate is untrusted and the client device 120 should follow an appropriate security policy in further communications with the server device 130. For example, the client device 120 can prompt a user to provide an input or a command indicating that the user wants to proceed with accessing the server device 130 knowing that it is untrusted. In contrast, if the server certificate 1025 is trusted, the security gateway 110 creates the gateway certificate 1045 and signs it with a different key such that the gateway certificate 1045 is deemed trusted with respect to the client device 120.

It should be noted that the server certificate 1045 can include a security certificate, such as an Internet security certificate, SSL certificate, CA certificate, corporate issued security certificate, network generated security certificate, trusted security certificate, user certificate, or any other digital security certificate used between peers of a secure data communication session. In some embodiments, the server certificate 1045 includes one or more of a digital signature, a key for encryption, a key for decryption, a cipher method data, an identity, data concerning an issuer of the certificate, and information related to an issuing CA.

In certain embodiments, the server security key of the server certificate 1025 can include a key for encryption and/or decryption, a public key, or any other key necessary for performing a cipher process according to the server certificate 1025.

In some embodiments, the security gateway 110 generates the gateway security key. For example, the security gateway 110 can generate the gateway security key using a public or standard key generation software library, randomly, or based on information from or about the client device 120. In yet additional embodiments, the security gateway 110 selects the gateway security key from a plurality of gateway keys pre-stored in the data store 115 of the security gateway 110.

In step 318, upon creation of the gateway certificate 1045, the security gateway 110 sends the gateway certificate 1045 to the client device 120 in a session response, which is a response packet for the session request 1015. When the client device 120 obtains the gateway certificate 1045 from the session response, in step 320, the client device 120 may check whether the gateway certificate 1045 is issued from a trusted organization. In certain embodiments, as the gateway certificate 1045 has the same issuing information as the server certificate 1025, the result of client device checking the gateway certificate 1045 would be the same as if the client device 120 checked whether the server certificate 1025 is to be trusted. In some embodiments, as a result of step 320, the client device 120 determines that the gateway certificate 1045 is trusted and continues (or allowed to continue) using the secure session 1005.

However, if the client device 120 determines that the gateway certificate 1045 is not trusted, the method 300 proceeds to step 322. Specifically, in step 322, the client device 120 can determine to continue the secure session 1005 even if the gateway certificate 1045 is not trusted. In this scenario, according to some embodiments, the client device 120 can receive an input from a user of the client device 120 to proceed with the secure session 1005, despite the fact that received gateway certificate 1045 is untrusted. In yet further embodiments, client device 120 includes or employs a pre-determined policy to determine whether to proceed with the secure session 1005 for the untrusted gateway certificate 1045.

In a subsequent step 324, the client device 120 continues with the secure session 1005 and sends secure content 1065 (e.g., any vulnerable data) over the secure session 1005 to the security gateway 110. In step 326, the security gateway 110 can intercept the secure content 1065 using one or more operations including receiving the secure content 1065, decrypt the secure content 1065 using the gateway security key of the gateway certificate 1045, inspect and apply one or more applicable security policies to the decrypted secure content, encrypt the decrypted secure content, using the server security key of the server certificate 1025 to generate encrypted secure content 1070, and send the encrypted secure content 1070 over the second secure session 1010 to the server device 130. The term "content," in this disclosure, includes any digital information or data.

Vice versa, in step 328, the server device 130 continues utilizing the secure session 1010 and sends encrypted secure content 1070' over the secure session 1010 to the security gateway 110. In step 330, the security gateway 110 intercepts the encrypted secure content 1070' using one or more operations including receiving the encrypted secure content 1070', decrypting encrypted secure content 1070' using the server security key of the server certificate 1025, inspecting and applying one or more applicable security policy to decrypted secure content, encrypting the decrypted secure content, using the gateway security key of the gateway certificate 1045, to generate encrypted secure content 1065', and sending the generated secure content 1065' over the secure session 1005 to the client device 120.

It should be noted that the secure content, such as the secure content 1065 or secure content 1070, may include encrypted payload for a secure session, and the encryption can be performed according to an encryption mechanism associated to the secure session.

Figure 4:
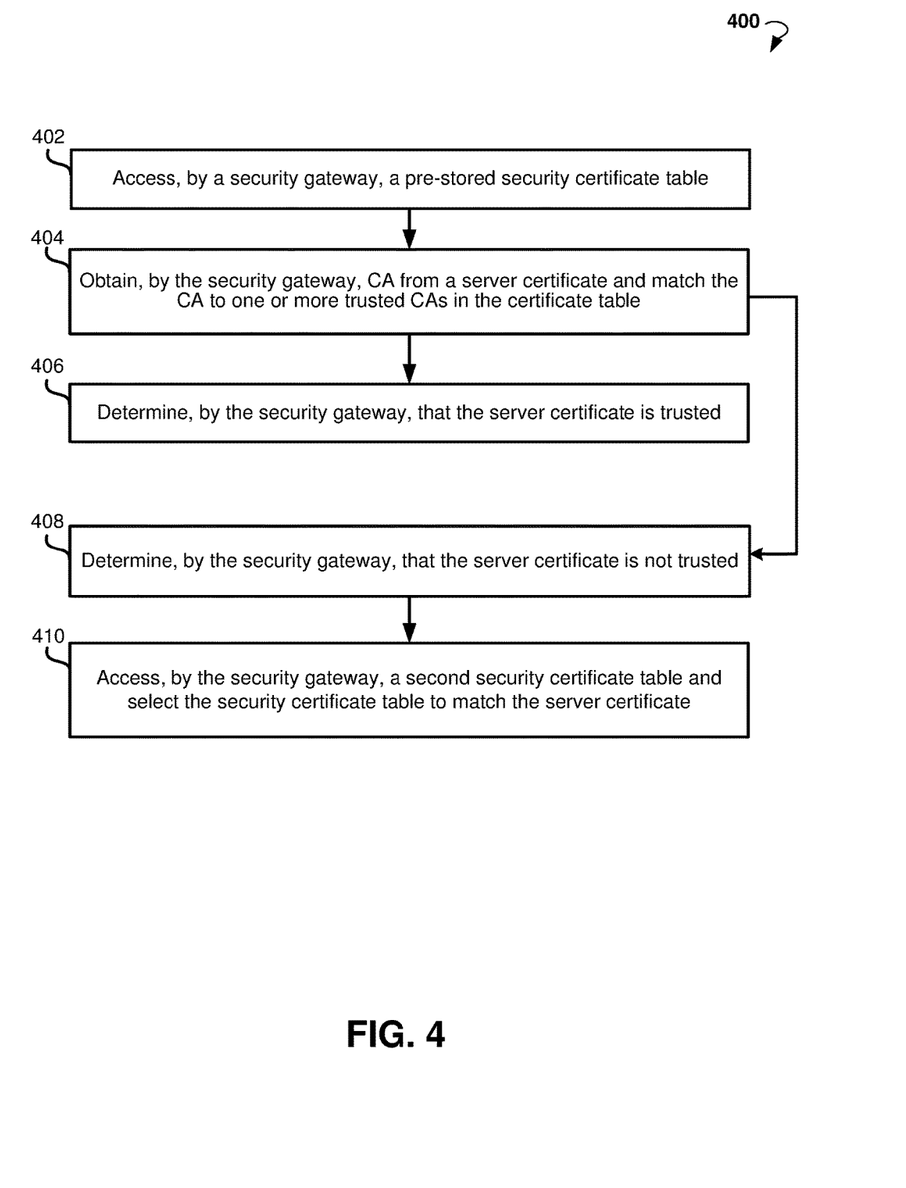
FIG. 4 illustrates a time diagram of a method for determining whether a server security certificate is trusted.

FIG. 4 illustrates a time diagram of a method 400 for determining if a server security certificate (such as the server security certificate 1025 shown on FIG. 3) is trusted, according to one example embodiment. The method 400 may be performed by processing logic that may comprise hardware (e.g., decision-making logic, dedicated logic, programmable logic, ASIC, and microcode), software (such as software run on a general-purpose computer system or a dedicated machine), or a combination of both. In one example embodiment, the method 400 is implemented by the devices of the computer environment 100 shown on FIG. 1, such as by the security gateway 110, the client device 120, and the server device 130. The steps of method 400 may be implemented in an order different than described and shown in FIG. 4. Moreover, the method 400 may have additional steps not shown herein, but which can be evident for those skilled in the art from the present disclosure. The method 400 may also have fewer steps than outlined below and shown in FIG. 4.

The method 400 can commence with step 402 with the security gateway accessing a pre-stored security certificate table. In one embodiment, the security certificate table includes one or more trusted CAs, such as a trusted CA. Generally, a certification authority (CA) is an entity that issues one or more digital security certificates based on one or more predetermined rules. A digital certificate certifies the ownership of a public security key by the named subject of the certificate. A CA can be a private or a public entity. For example, a trusted CA, such as the trusted CA, is trusted both by the subject (owner) of the certificate and by a party such as the client device or security gateway relying upon the certificate.

In certain embodiments of this disclosure, the server certificate includes a CA. In step 404, the security gateway 110 obtains the CA from the server certificate and matches the CA against the one or more trusted CAs in the certificate table. In one embodiment, the security gateway finds there is a match of the CS with the trusted CA. In this scenario, the method 400 proceeds to step 406, in which the security gateway determines whether the server certificate is trusted.

Alternatively, if in step 404 the security gateway does not find a match between the trusted CA and the one or more trusted CAs in the certificate table, the method 400 proceeds to step 408, in which the security gateway determines that the server certificate is not trusted or untrusted, and the method 400 then proceeds to step 410.

In step 410, the security gateway accesses a second security certificate table (which can be stored in the data store 115 shown on FIG. 1) and selects the security certificate table to match the server certificate. In one embodiment, the security gateway selects the security certificate table based on information concerning the client device. The information concerning the client device can be obtained from or directly associated to the client device. In certain embodiments, this information concerning the client device indicates that the client device is from a private corporate network and the security gateway can select the security certificate table corresponding to the private corporate network. In yet additional embodiments, the information concerning the client device indicates that a software application, such as a web browser or a mobile application, runs on the client device, and the security gateway can selects the security certificate table corresponding to this software application.

In step 412, the security gateway can match the server certificate against the security certificate table and the security certificate table. In one embodiment, the security certificate table stores security certificates for public services or issued by public CAs. Moreover, the security certificate table can store private security certificates. As a result of matching of the server certificate against the security certificate table and the security certificate table, it can be determined, by the security gateway, whether the server certificate is trusted.

Figure 5:
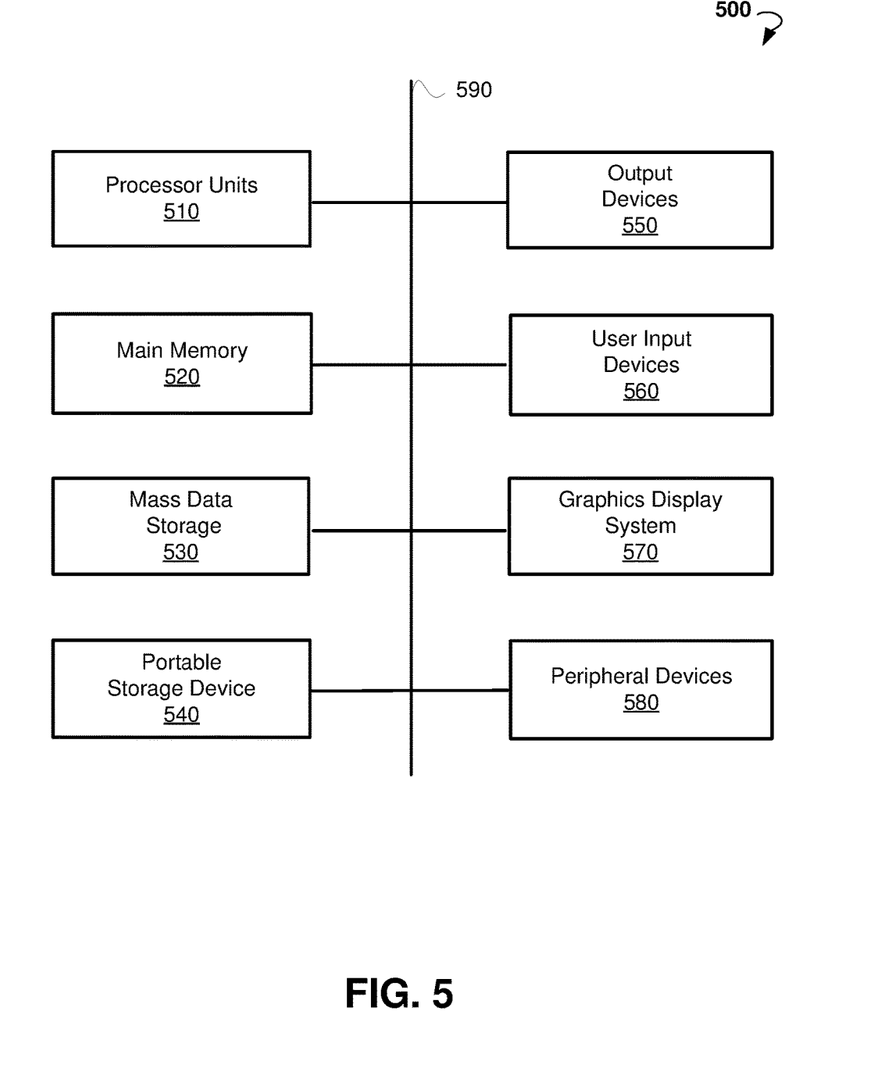
FIG. 5 is a diagrammatic representation of a computing device for a machine, within which a set of instructions for causing the machine to perform any one or more of the methodologies discussed herein can be executed.

FIG. 5 illustrates a computer system 500 that may be used to implement embodiments of the present disclosure, according to an example embodiment. The computer system 500 may serve as a computing device for a machine, within which a set of instructions for causing the machine to perform any one or more of the methodologies discussed herein can be executed. The computer system 500 can be implemented in the contexts of the likes of computing systems, networks, servers, or combinations thereof. The computer system 500 includes one or more processor units 510 and main memory 520. Main memory 520 stores, in part, instructions and data for execution by processor units 510. Main memory 520 stores the executable code when in operation. The computer system 500 further includes a mass data storage 530, a portable storage device 540, output devices 550, user input devices 560, a graphics display system 570, and peripheral devices 580. The methods may be implemented in software that is cloud-based.

The components shown in FIG. 5 are depicted as being connected via a single bus 590. The components may be connected through one or more data transport means. Processor units 510 and main memory 520 are connected via a local microprocessor bus, and mass data storage 530, peripheral devices 580, the portable storage device 540, and graphics display system 570 are connected via one or more I/O buses.

Mass data storage 530, which can be implemented with a magnetic disk drive, solid state drive, or an optical disk drive, is a non-volatile storage device for storing data and instructions for use by processor units 510. Mass data storage 530 stores the system software for implementing embodiments of the present disclosure for purposes of loading that software into main memory 520.

The portable storage device 540 operates in conjunction with a portable non-volatile storage medium, such as a floppy disk, a compact disk, a Digital Versatile Disc (DVD), or USB storage device, to input and output data and code to and from the computer system 500. The system software for implementing embodiments of the present disclosure is stored on such a portable medium and input to the computer system 500 via the portable storage device 540.

User input devices 560 provide a portion of a user interface. User input devices 560 include one or more microphones; an alphanumeric keypad, such as a keyboard, for inputting alphanumeric and other information; or a pointing device, such as a mouse, a trackball, stylus, or cursor direction keys. User input devices 560 can also include a touchscreen. Additionally, the computer system 500 includes output devices 550. Suitable output devices include speakers, printers, network interfaces, and monitors.

Graphics display system 570 includes a liquid crystal display or other suitable display device. Graphics display system 570 receives textual and graphical information and processes the information for output to the display device. Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media can include any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that include a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for intercepting a secure session with an untrusted server certificate been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for intercepting a secure session, the system comprising:
a network device configured to:
intercept a first secure data session, wherein the first secure data session is established between a client device and a server device via a security gateway;
establish a second secure data session between the server device and the security gateway;
receive a first secure session request from the client device over the first secure data session;
receive a server certificate from the server device over the second secure data session, the server certificate being associated with the first secure session request;
determine that the server certificate is untrusted;
in response to the determining that the server certificate is untrusted, generate a gateway certificate based on the server certificate;
provide the gateway certificate to the client device, wherein the client device determines that the gateway certificate is untrusted and determines, based on a security policy, whether to proceed with the first secure data session; and
receive first secure content from the client device over the first secure data session; and
a processor being in operative connection with the network device, wherein the processor is configured to:
create first encrypted secure content using the first secure content and the server certificate from the server device; and
send or cause sending the first encrypted secure content to the server device over the second secure data session.

2. The system of claim 1, wherein the processor module is further configured to:
in response to receiving the first secure session request from the client device, generate a second secure session request based on the first secure session request, wherein the second secure session request differs from the first secure session request; and
send or cause sending the second secure session request to the server device over the second secure session.

3. The system of claim 2, further comprising the server device operable to:
in response to receiving the second secure session request from the security gateway, generate by the server device the server certificate; and
send the server certificate to the security gateway over the second secure session.

4. The system of claim 2, wherein the processor is further configured to:
access a server certificate table containing a plurality of security certificates from a data store; and
match the server certificate against the plurality of security certificates of the security certificate table, wherein the determining that the server certificate is untrusted is performed based on the matching.

5. The system of claim 4, wherein the processor is further configured to:
in response to determining that the server certificate is untrusted, check a security policy; and
determine whether interception of content transferrable using the first secure session or the second secure session is required based on the security policy.

6. The system of claim 5, wherein the processor generates the gateway certificate in response to determining that interception of content transferrable using the first secure session or the second secure session is required.

7. The system of claim 6, wherein the processor module is further configured to:
copy the server certificate to the gateway certificate;
replace a server security key with a gateway security key, wherein the gateway security key is untrusted with respect to the client device; and
sign the gateway certificate using the gateway key.

8. The system of claim 7, wherein the processor further provides the gateway certificate to the client device by sending the gateway certificate to the client device in a packet, wherein the packet is a response to the first secure session request.

9. The system of claim 8, wherein the processor is further configured to:
receive second secure content from the server device over the second secure data session;
create second encrypted secure content using the second secure content and a gateway certificate; and
send the second encrypted secure content to the client device over the first secure data session.

10. A method for intercepting a secure session, the method comprising:
establishing a first secure data session between a client device and a server device via a security gateway;
intercepting the first secure data session by the security gateway;
establishing, by the security gateway, a second secure data session between the server device and the security gateway;
receiving, by the security gateway, a first secure session request from the client device over the first secure data session;
receiving, by the security gateway, a server certificate from the server device over the second secure data session, the server certificate being associated with the first secure session request;
determining, by the security gateway, that the server certificate is untrusted;
in response to the determining that the server certificate is untrusted, generating, by the security gateway, a gateway certificate based on the server certificate;
providing, by the security gateway, the gateway certificate to the client device, wherein the client device determines that the gateway certificate is untrusted and determines, based on a security policy, whether to proceed with the first secure data session;
receiving, by the security gateway, first secure content from the client device over the first secure data session;
creating, by the security gateway, first encrypted secure content using the first secure content and the server certificate from the server device; and
sending, by the security gateway, the first encrypted secure content to the server device over the second secure data session.

11. The method of claim 10, further comprising:
in response to receiving the first secure session request from the client device, generating by the security gateway, a second secure session request based on the first secure session request, wherein the second secure session request differs from the first secure session request; and
sending by the security gateway the second secure session request to the server device over the second secure session.

12. The method of claim 11, further comprising:
in response to receiving the second secure session request from the security gateway, generating, by the server device, the server certificate; and
sending, by the server device, the server certificate to the security gateway over the second secure session.

13. The method of claim 11, further comprising:
accessing, by the security gateway, a server certificate table containing a plurality of security certificates from a data store; and
matching the server certificate against the plurality of security certificates of the security certificate table, wherein the determining that the server certificate is untrusted is performed based on the matching.

14. The method of claim 13, further comprising:
in response to determining that the server certificate is untrusted, checking by the security gateway a security policy; and
determining whether interception of content transferrable using the first secure session or the second secure session is required.

15. The method of claim 14, wherein the generating by the security gateway of the gateway certificate is performed in response to determining that interception of content transferrable using the first secure session or the second secure session is required.

16. The method of claim 15, further comprising:
copying by the security gateway the server certificate to the gateway certificate;
replacing by the security gateway a server security key with a gateway security key, wherein the gateway security key is untrusted with respect to the client device; and
signing, by the security gateway, the gateway certificate using the gateway key.

17. The method of claim 15, wherein the providing of the gateway certificate to the client device includes
sending by the security gateway the gateway certificate to the client device in a packet, which is a response to the first secure session request.

18. The method of claim 17, further comprising:
if it is determined by the client device that the gateway certificate is untrusted, using the first secure data session to transmit secure data from the client device to the server device.

19. The method of claim 17, further comprising:
receiving, by the security gateway, second secure content from the server device over the second secure data session;
creating, by the security gateway, second encrypted secure content using the second secure content and a gateway certificate; and
sending, by the security gateway, the second encrypted secure content to the client device over the first secure data session.

20. A non-transitory processor-readable medium having instructions stored thereon, which when executed by one or more processors, cause the one or more processors to implement a method for intercepting a secure session, the method comprising:
enabling to establish a first secure data session between a client device and a server device via a security gateway;
intercepting the first secure data session by the security gateway;
establishing, by the security gateway, a second secure data session between the server device and the security gateway;
receiving, by the security gateway, a first secure session request from the client device over the first secure data session;
receiving, by the security gateway, a server certificate from the server device over the second secure data session, the server certificate being associated with the first secure session request;
determining, by the security gateway, that the server certificate is untrusted;
in response to the determining that the server certificate is untrusted, generating, by the security gateway, a gateway certificate based on the server certificate;
providing, by the security gateway, the gateway certificate to the client device, wherein the client device determines that the gateway certificate is untrusted and determines, based on a security policy, whether to proceed with the first secure data session;
receiving, by the security gateway, first secure content from the client device over the first secure data session;
creating, by the security gateway, first encrypted secure content using the first secure content and the server certificate from the server device; and
sending, by the security gateway, the first encrypted secure content to the server device over the second secure data session.

* * * * *